Figure 1:
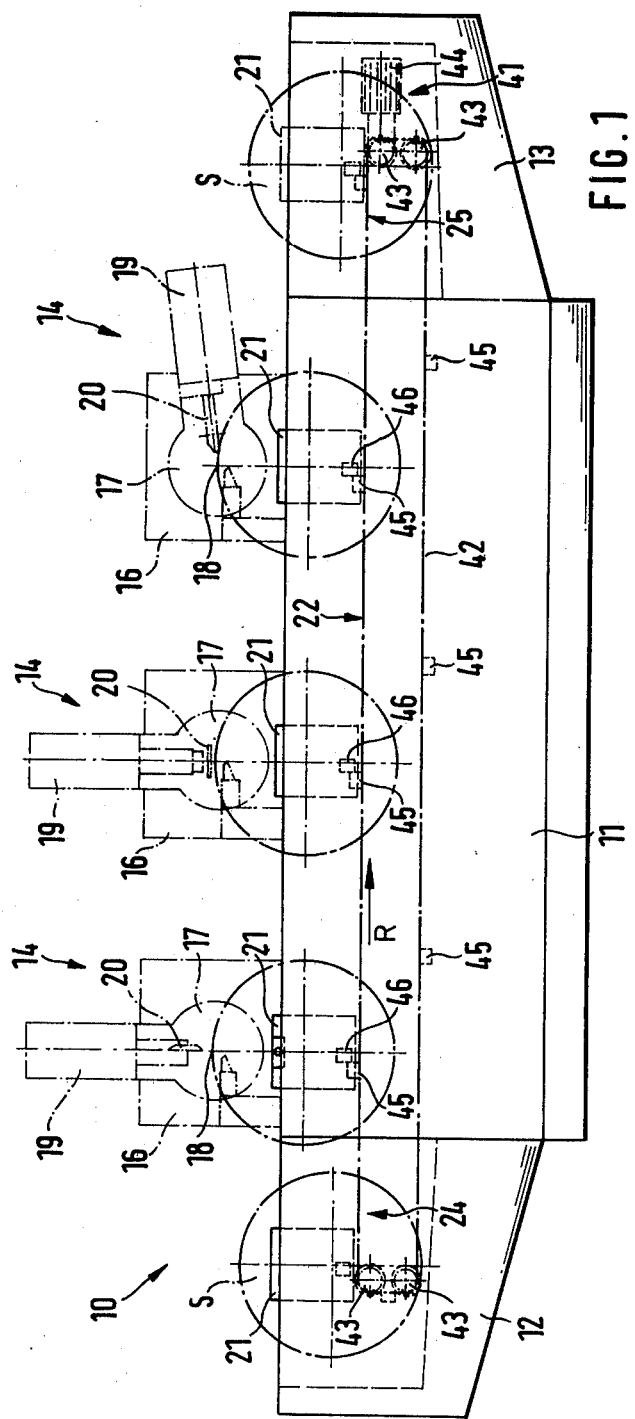

United States Patent [19]

Beck et al.

[11] 4,449,427

[45] May 22, 1984

[54] MACHINE FOR MACHINING CIRCULAR SAW BLADES

[75] Inventors: Ernst Beck, Maselheim; Peter Lenard, Biberach an der Riss; Erich Pokorny, Schemmerhofen, all of Fed. Rep. of Germany

[73] Assignee: Vollmer Werke Maschinenfabrik GmbH, Fed. Rep. of Germany

[21] Appl. No.: 331,210

[22] Filed: Dec. 16, 1981

[30] Foreign Application Priority Data

Dec. 23, 1980 [DE] Fed. Rep. of Germany ....... 3048738
Dec. 23, 1980 [DE] Fed. Rep. of Germany ....... 3048739

[51] Int. Cl.³ .............................................. B23D 63/14
[52] U.S. Cl. ........................................... 76/77; 76/37
[58] Field of Search .................. 76/37, 75, 77, 40, 41

[56] References Cited

U.S. PATENT DOCUMENTS 519,893 5/1894 Newton ................................. 76/75

FOREIGN PATENT DOCUMENTS 1502975 1/1970 Fed. Rep. of Germany .......... 76/37
803335 10/1958 United Kingdom .................... 76/37

Primary Examiner—Roscoe V. Parker
Attorney, Agent, or Firm—Eyre, Mann, Lucas & Just

[57] ABSTRACT

The invention relates to apparatus for machining circular saw blades and more particularly to the transport means for conveying workpieces to the machining stations of the apparatus. In accordance with the invention, the storage capability of the apparatus is accomplished by subdividing the conveying means into a work path leading through the machining stations; a return path leading through a feeding and discharging station; two branch paths wherein an endless conveyor is arranged only along the work path and associated with the branch paths there are shifting means capable of shifting a work piece carriage from the branch path to the return path; and that on the return path, work piece carriages are maintained at smaller distances than those of the endless conveyor whereby the storage capacity of the apparatus is increased. The apparatus is also adjustable to feed a plurality of different saw diameters for machining. In each machining station there is a feed device for turning a circular saw blade affixed to an arbor of the workpiece carriage so that the saw teeth are advanced one tooth spacing or in special cases several tooth spacings, each time the feed is initiated.

4 Claims, 8 Drawing Figures

MACHINE FOR MACHINING CIRCULAR SAW BLADES

The invention relates to a machine for machining circular saw blades, comprising
  a plurality of machining stations arranged in a row,
  a feeding and discharging station,
  a closed conveying path,
  a number of workpiece carriages exceeding the number of stations and movable on the conveying path, and
  an endless conveyor moving the workpiece carriages step by step, from station to station.

In a known machine of this kind, the endless conveyor is formed by two endless chains disposed in a parallel orientation, one above the other, together with the accessory guide rollers. The workpiece carriages are fastened to the chains at equal distances. The distances between the workpiece carriages have to correspond to the distances between the machining stations and are thus predetermined for the entire transport means, regardless of the diameter of the circular saw blades to be machined. Consequently the storage capacity of this known transport means is small in proportion to the overall length of its conveying path. It is necessary for treated saw blades to be removed at short time intervals and replaced by untreated ones. It is an object of the present invention to increase the storage capacity of a machine of the type described at the outset. According to the invention, this object is accomplished in that the conveying path is subdivided into
  a work path leading through the machining stations,
  a return path leading through the feeding and discharging station, and
  two branch paths each disposed on a transverse carriage and being reciprocable therewith between positions in which the said paths link up with the work path and return path,
  that the endless conveyor is arranged only along the work path and the adjoining branch paths and has equidistantly spaced attachments cooperating with a mating member on each workpiece carriage, that associated with the branch path, which is reciprocable between the end of the work path and the beginning of the return path, there is a shifting means capable of shifting one workpiece carriage at a time from said branch path to the return path, and
  that the workpiece carriages have stops through which the workpiece carriages abut against one on the return path and are maintained at distances from one another smaller than the distances between the attachments of the endless conveyor.

It is thus achieved that the distances between the machining stations, to which the distances between the attachments of the endless conveyor have to correspond, determine the distances between the workpiece carriages only on the work path. On the return path the workpiece carriages can move closer together, their spacing there being determined only by the stops on the workpiece carriages themselves. Due to the workpiece carriages moving closer together, more of them can be accommodated on the return path than on the work path, even if the former is not longer than the latter. Owing to work path and return path being separate, it is moreover possible to make the return path longer than the work path or to provide a plurality of return paths which are interchangeable in the manner of magazines, in each case one of said return paths communicating with the work path via the branch paths.

In a preferred embodiment of the invention, the stops on the workpiece carriages are adjustable according to the workpiece size. This makes it possible to limit the distances between the workpiece carriages on the return path to the minimum determined by the respective workpiece size and thus to optimally utilize the storage capacity of the return path.

The subject matter of the invention is preferably developed further in that the attachment mating member of each workpiece carriage is fastened to a workpiece carrier. The workpiece carrier is shiftably guided on the workpiece carriage in a direction transverse to the transporting direction of the latter and has a centering projection. At each machining station, the workpiece carrier can be shifted by a shifting drive from a transporting position into a working position. In this working position the mating member is disengaged from the attachment of the endless conveyor and the centering projection is centered on a fixed centering element. In this manner the transport means of the invention does away with the individual workpiece carriages being permanently linked to the endless conveyor-as is the case in the known transport means described-not only on the return path but also on the work path during stoppage at the machining stations. Tolerances in the spacing of the attachments on the endless conveyor have no effect on the accuracy of the working positions the workpiece carriers assume in the machining stations, this accuracy being determined solely by the cooperation between the centering projection located on the respective workpiece carrier and the fixed centering element.

The invention furthermore relates to a machine for machining circular saw blades, including an arbor for a saw blade and a feed device for intermittently rotating the saw blade, a guide adapted to be swivelled about the axis of the arbor and carrying at an adjustable radial distance from said axis a pawl bearing to which a feed pawl is mounted for engaging behind each saw tooth, and further including a swivel drive for swivelling the guide to and fro.

In known feed devices of this kind, the guide is mounted to an arbor means for the saw blade and the distance between the axis of said arbor means and the pawl bearing can be set by hand in accordance with the diameter of the saw blade. This is time-consuming, especially when the machine for machining the saw is one having a plurality of stations where a corresponding number of saw blades are machined simultaneously, e.g. ground at the cutting edges, backs and sides of the teeth.

It is therefore a further object of the invention to develop the feed device of the described type in such a way that on the basis of simple control commands the feed device can be adjusted, optionally at the same time as a plurality of identical feed devices, to different saw diameters.

According to the invention, this object is accomplished in that the guide is adapted to be shifted longitudinally in a guide slideway and to be clamped by a clamping device, that the guide slideway for the swivelling of the guide is mounted to a guide carriage which, for adjustment to different saw diameters, is radially adjustable relative to the arbor, that the swivel drive can be fixed in a position in which the guide extends in the adjusting direction of the guide carriage, and that a holding means is associated with the guide for holding it in the said position while the clamping means is open for adjusting the guide carriage.

This enables the effective length of the guide to be adapted to the saw blade radius in a way which is particularly simple and hence easy to automate.

In a preferred embodiment of the invention, the swivel drive is an electrohydraulic linear servo motor swivel-mounted on a fixed machine housing and articulated to the guide. German laid open print No. 28 29 911 discloses a linear drive in the form of an electrohydraulic follow-up servo control, which is particularly suitable for the feed device of the invention.

It is furthermore advantageous if the holding means is devised to engage a head portion of the guide, said head portion incorporating the pivot axis of the swivel drive. It is particularly advantageous if the holding means has a pin devised to engage in a recess at the head portion side averted from the swivel drive. By virtue of the pin and the recess in which it engages being conically shaped, as is conventional with such pins of the known index pin type, the guide can always be re-positioned with especial accuracy.

Figure 2:
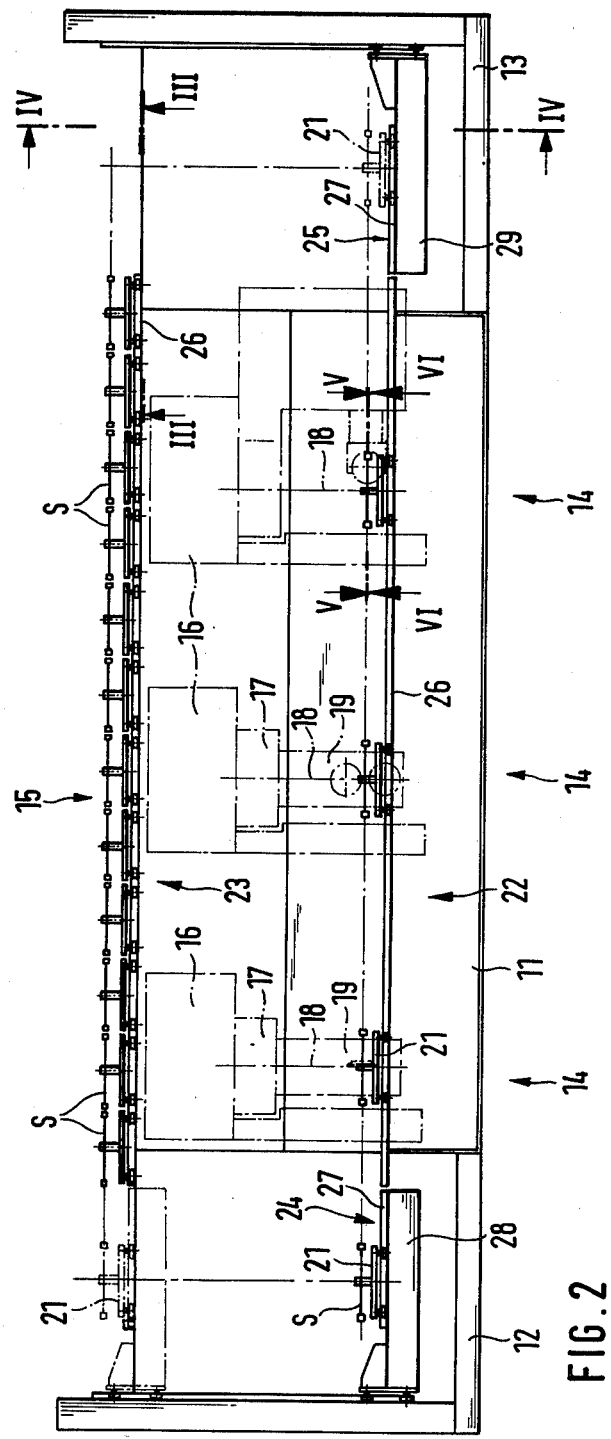
Figure 3:
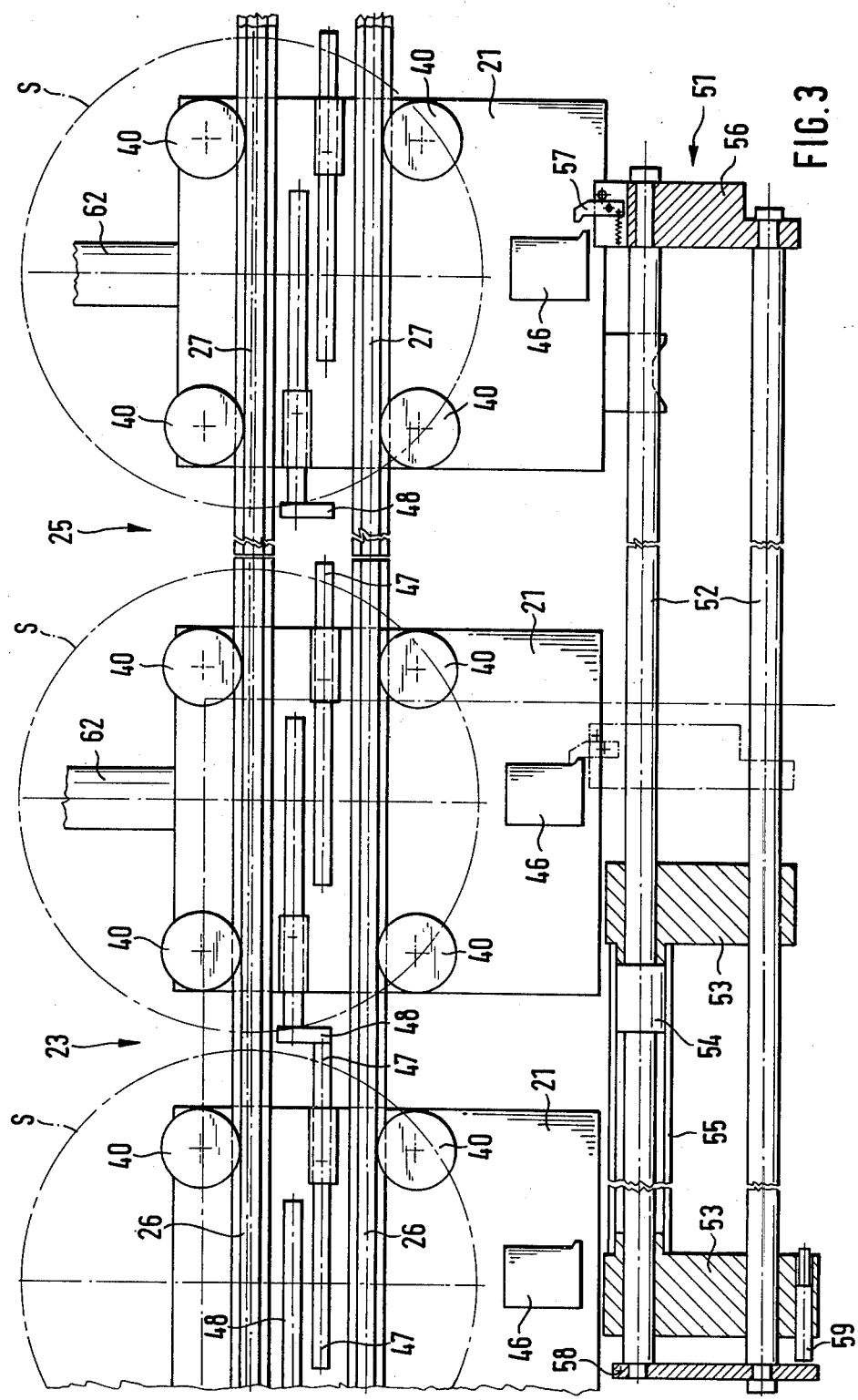
Figure 4:
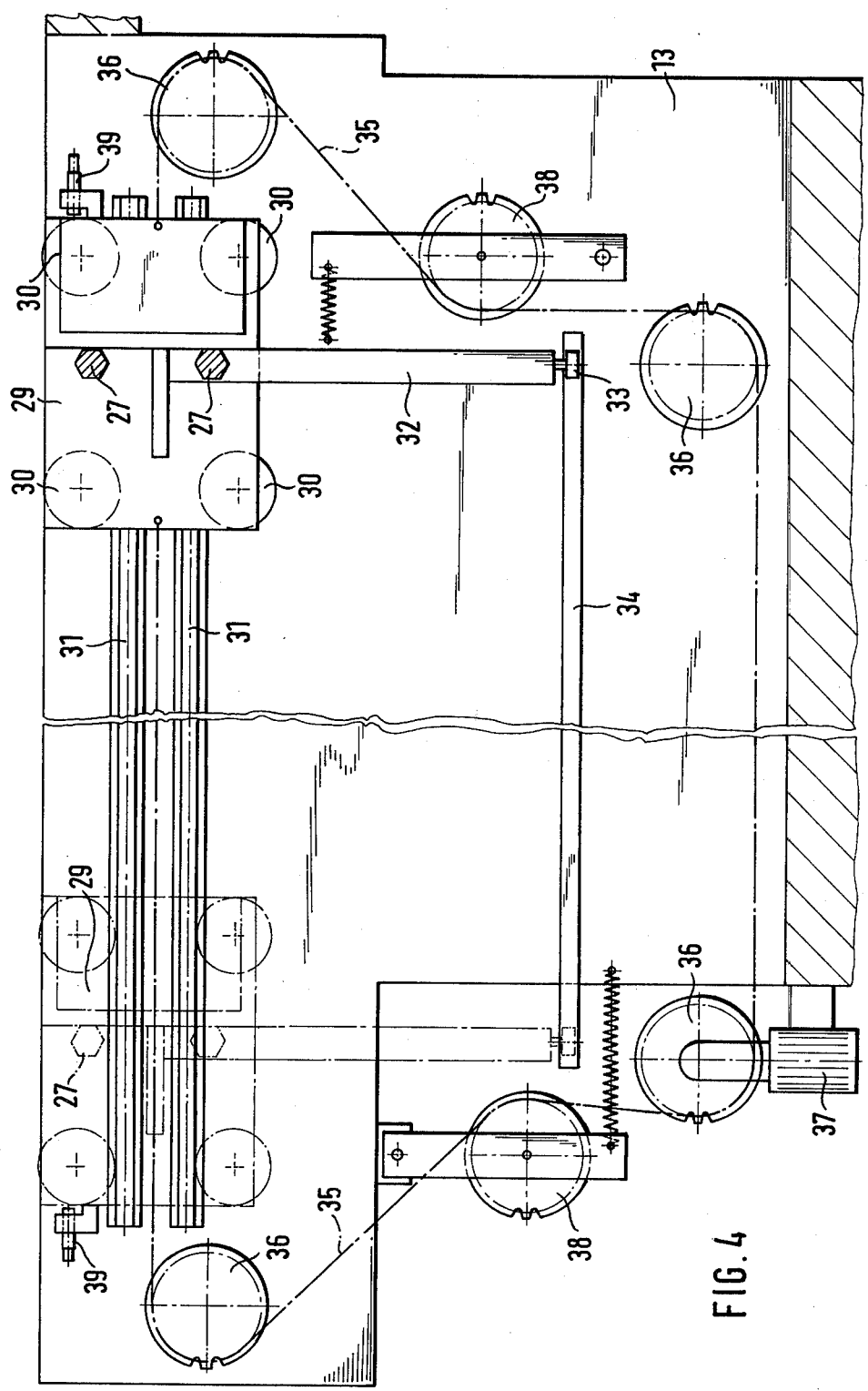
Figure 5:
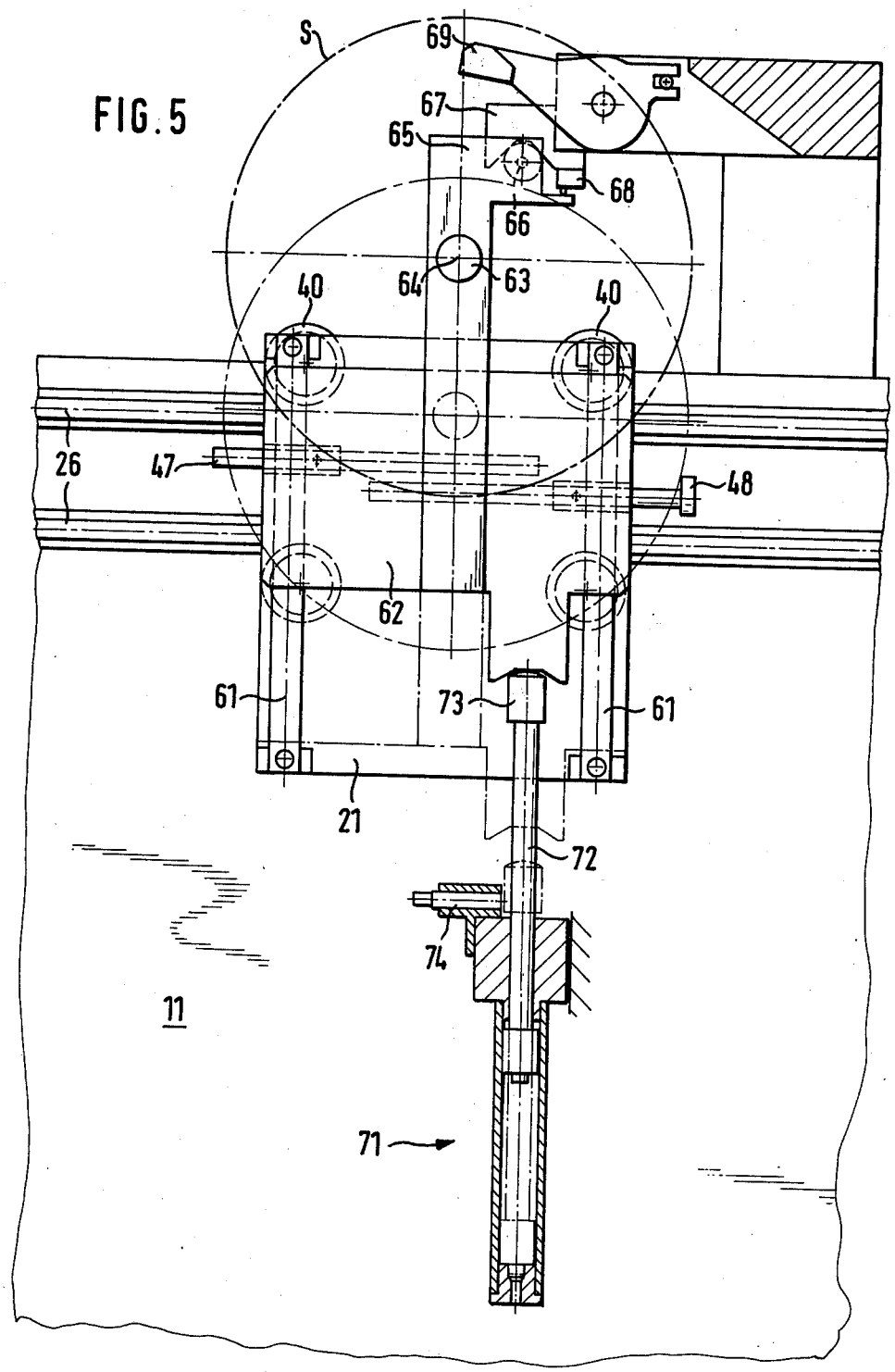
Figure 6:
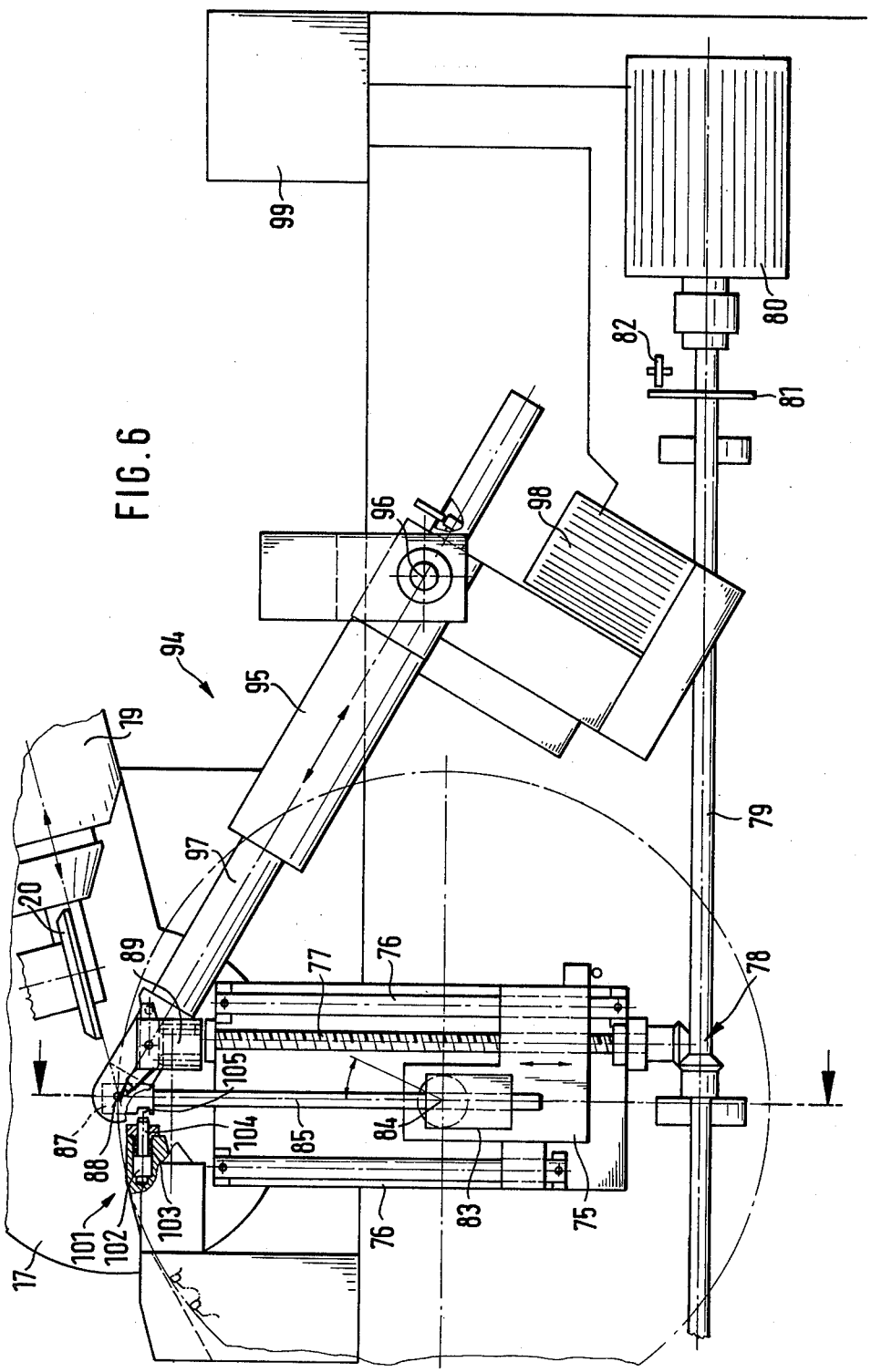
Figure 7:
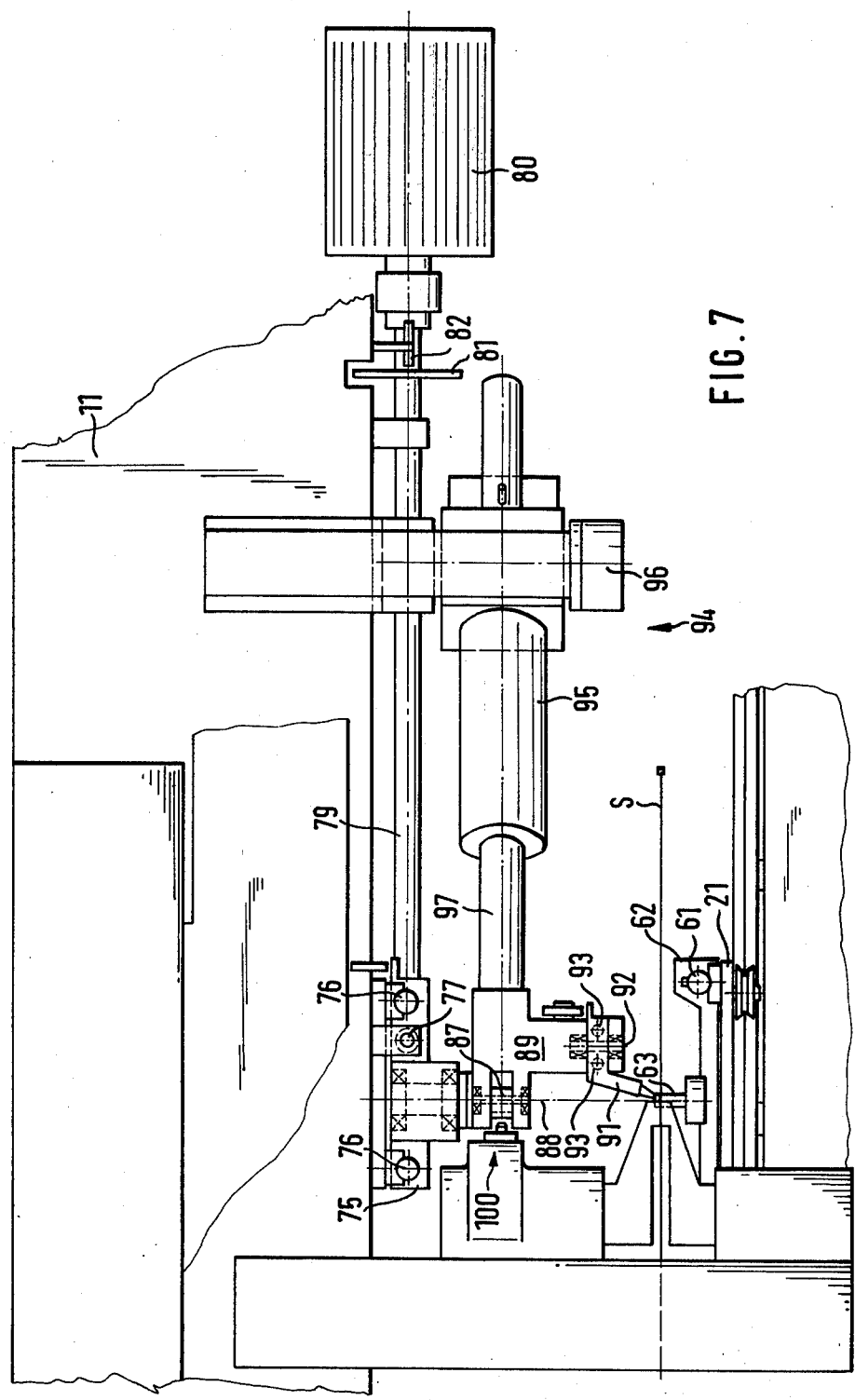
Figure 8:
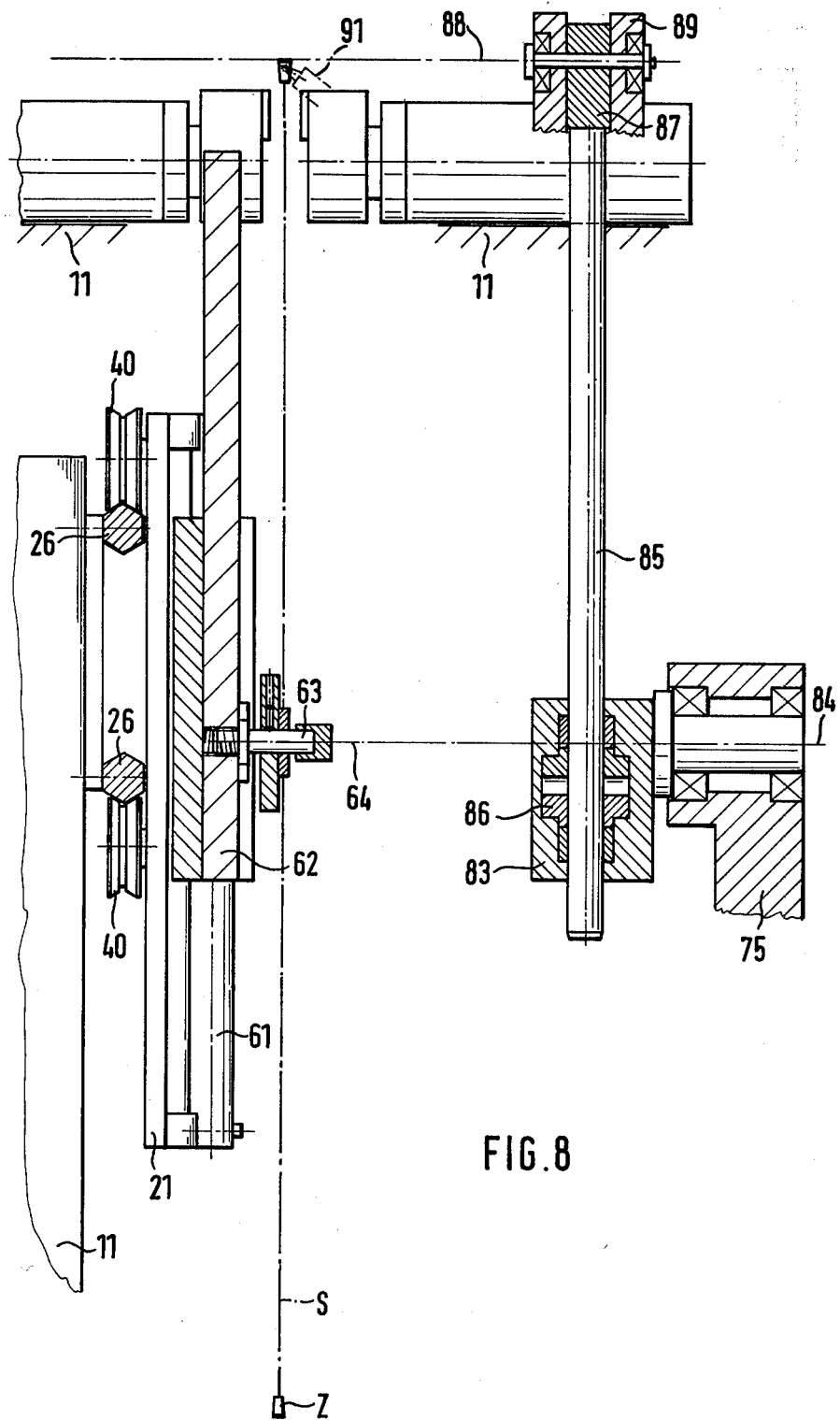

Embodiments of the invention are described below with the help of schematic drawings in which FIG. 1 is a front view of a machine according to the invention for machining circular saw blades, FIG. 2 is the plan view of the machine, FIG. 3 is the partial longitudinal section III—III in FIG. 2, FIG. 4 is the transverse section IV—IV in FIG. 2, FIG. 5 is the partial longitudinal section V—V in FIG. 2, FIG. 6 is the partial longitudinal section VI—VI in FIG. 2, FIG. 7 is the partial plan view pertaining to FIG. 6, and FIG. 8 is the partial transverse section VIII—VIII in FIG. 6.

FIGS. 1 and 2 give a general view of a machine 10 for machining circular saw blades S whose teeth Z are to be polished. The machine 10 has a machine housing 11 in the form of an elongate, horizontal cuboid. Arms 12 and 13 are secured to the narrow sides thereof at the left and right, respectively, in FIGS. 1 and 2. In the illustrated example, three machining stations 14 are disposed partly on and partly in the machine housing side to the front in FIGS. 1 and 2, the lefthand one for grinding the cutting edges of teeth, the center one for grinding the sides of teeth and the right-hand one for grinding the back of teeth. The machine housing 11 rear side averted from the viewer of FIG. 1 is devised as the feeding and discharging station 15.

In each of the machining stations 14, a box-shaped support 16 is mounted on the machine housing 11. At the front of said support 16 there is a grinding unit 17 adapted for swivel-adjustment about a horizontal swivel axis 18 disposed at right angles to the machine housing 11. Each grinding unit 17 has a grinding-wheel head 19 reciprocable radially to the respective swivel axis 18. A grinding-wheel spindle with accessory grinding disk 20 is mounted in each grinding-wheel head 19. The supports 16 and grinding units 17, together with the accessory members, are only roughly outlined by dot-dash lines, because they may be of any conventional design.

Around the machine frame 11 a transport means is arranged for successively conveying the circular saw blades S by steps from the feeding and discharging station 15 to the work station 14 and back to station 15. The transport means includes a large number of workpiece carriages 21. In the illustrated example of FIG. 2 there are sixteen. A work path 22 for the workpiece carriages 21, which extends through all the machining stations 14, is formed at the front of the machine housing 11. A return path 23 is formed at the rear of the machine frame 11. Branch paths 24 and 25 are formed at the two arms 12 and 13, respectively. The work path 22 and the return path 23 are each formed by two bars 26 which are fixed parallel to one another in a vertical plane. The two vertical planes in which the bars 26 of the work path 22 on the one hand, and of the return path 23 on the other hand, lie, are also parallel to one another. Each of the branch paths 24 and 25 has two bar portions 27. The cross sections of bars 26 and bar portions 27 are the same and in the illustrated example are hexagonal. The vertical distance between the bars 26 on the one hand and the bar portions 27 on the other hand is exactly the same. The bar portions 27 of the branch path 24 on the left in FIGS. 1 and 2 are secured to a transverse carriage 28 on the left. In an analogous manner, the bar portions 27 of the righthand branch path 25 are secured to a transverse carriage 29 on the right. As per FIGS. 2 and 4, the two transverse carriages 28 and 29 can be reciprocated between end positions in which the bar portions 27 align with the bars 26 of the work path 22 or of the return path 23 and link up with them almost without a gap.

For this purpose each of the two transverse carriages 28 and 29 has four rollers 30 running on a pair of horizontal cross bars 31. The cross bars 31 for the transverse carriages 28 and 29 are secured straight above one another to the respective arm 12 or 13 and likewise have a hexagonal cross section which, however, need not be identical to that of bars 26 and 27. Of the four rollers 30 of each transverse carriage 28, 29, two run on the upper side of the upper cross bar 31 and two run on the underside of the lower cross bar 31. For additional stabilization, each transverse carriage 28 and 29 has a limb 32 projecting straight down with a roller 33 running on a horizontal track 34 formed at the respective arm 12, 13.

The two ends of a gall chain 35 are secured to each transverse carriage 28 and 29. The chain 35 runs over guide rollers 36, one driven by a motor 37, and over idlers 38. The branch paths 24 and 25 are defined by a stop 39 at each of their two ends. A limit switch is assigned to each stop 39.

In a similar way as the transverse carriages 28 and 29 run on the cross bars 31, the workpiece carriages 21 each run with two pairs of rollers 40 on the bars 26 and bar portions 27, yet without being permanently connected to a chain. The workpiece carriages 21 are transported along the work path 22 and along the branch paths 24 and 25—as long as the latter are in alignment with the work path 22—by an endless conveyor 41. The endless conveyor 41 is located at the front of the machine housing 11 and has an endless gall chain 42 running over guide rollers 43, one driven by a motor 44, as well as attachments 45. The attachments 45 are disposed on the gall chain 42 at equal distances corresponding to the distances between the machining stations 14. Each workpiece carriage 21 has a member 46 mating with the attachments. This ensures that as long as the workpiece carriages 21 run on the work path 22 they are kept apart from one another at distances likewise corresponding to the distances between the machining stations 14. Due to it being necessary for the grinding units 17 to be adjustable and accessible, the space required by each machining station 14, and hence the distance between any two machining stations, is considerably larger than the diameter of the largest circular saw blade S to be machined. However, the space occupied is not so large for it to be possible and expedient for a further workpiece carriage to be interposed between the workpiece carriages 21 standing in each machining station 14 whenever the endless conveyor 41 is at a standstill. Relatively little economy of space on the work path 22 is therefore inevitable.

The situation is different on the return path 23; there, as shown in FIGS. 2 and 3, the distance between the workpiece carriages 21 need only be slightly larger than the diameter of the circular saw blades S to be machined. In order for this distance to be maintained and hence to prevent the circular saw blades S from colliding, there are adjustably secured to each workpiece carriage 21 two stops 47 and 48 projecting towards and away from its direction of motion. The stops 47 and 48 are formed such that each front stop 47 of a workpiece carriage 21 abuts against the rear stop 48 of the preceding workpiece carriage 21 before the respective circular saw blades S can impact. The adjustability of stops 47 and 48 enables the distances between the workpiece carriages 21 to be adapted to the diameter of the circular saw blades S to be machined. When machining smaller circular saw blades S, a larger number of workpiece carriages 21 can be implemented than when machining larger circular saw blades.

The endless conveyor 41 moves stepwise the distance between adjacent machining stations 14 and, at the end of each step, leaves a workpiece carriage 21 on the righthand transverse carriage 29, as indicated with dot-dash lines in FIG. 2. During each movement of the endless conveyor 41, the said transverse carriage 29 assumes the position drawn with solid lines in FIG. 2, in which position its bar portions 27 are in alignment with the bars 26 of the work path 22. By a subsequent transverse movement, the transverse carriage 29 together with the last-mentioned workpiece carriage 21 goes from the position drawn in FIG. 4 with solid lines into the position drawn with dot-dash lines, in which the bar portions 27 of said transverse carriages are in alignment with the bars 26 of the return path 23. The last-mentioned workpiece carriage 21 can now reach the return path 23. The driving force required for this and for further movement along the return path 23 could be provided by a slight incline. However, in the illustrated example, a shifting means 51 is provided. After each working cycle of the endless conveyor 41 and the following transverse movement of the transverse carriage 29, the shifting means 51 forces the workpiece carriage 21 transported on transverse carriage 29 across to the return path 23 and thereby advances all the workpiece carriages 21 already standing there. According to FIG. 3, the shifting means 51 includes two bars 52 which are disposed parallel to and below the bars 26 of the return path 23 and are adapted to be shifted in a slideway 53. The upper one of the two bars 52 bears a piston 54 working in a pneumatic cylinder 55. The bars 52 bear at their end on the right in FIG. 3 a pawl carrier 56 to which a pawl 57 is swivel-mounted in such a way that whenever it moves to the left it engages and entrains the attachment mating member 46 of a workpiece carriage 21. The ends to the left in FIG. 3 of bars 52 are interconnected by a stop plate 58 cooperating with a stop 59 adjustably secured to the machine housing 11 and combined with a limit switch.

Each workpiece carriage 21 has a pair of vertical slideways 61 on which a workpiece carrier 62 is adapted to be vertically shifted. An arbor 63, whose geometric axis 64 extends horizontally and at right angles to bars 26, is secured to the workpiece carrier 62 of each workpiece carriage 21. At the upper end of the workpiece carrier 62, a centering projection 65 is formed on which a centering roller 66 is mounted. In the machining stations 14, a fixed centering element 67 is assigned to each centering roller 66 of each workpiece carriage 21 in such a way that the workpiece carriages 21 are accurately centered in relation to a machining station 14 whenever said centering roller 66 engages in said centering element 67, as per FIG. 5. At each fixed centering element 67 there is a limit switch 68 for generating a signal indicating this occurence. In each machining station 14 there is furthermore located a pair of clamping jaws 69 for clamping one circular saw blade S at a time. The clamping jaws may, by way of example, be hydraulically operable.

In each machining station 14 there is furthermore a shifting drive 71 which, in the illustrated example of FIG. 5, takes the form of a pneumatic piston-cylinder unit with a piston rod 72 and a head 73 at the upper end thereof. The function of the shifting drive 71 is that the head 73 engages the workpiece carrier 62 of the respective workpiece carriage 21 standing in the machining station 14 in question, to shift said workpiece carrier 62 out of the lower position indicated by dot-dash lines in FIG. 5 into the upper position indicated by solid lines. The attachment mating member 46 of each workpiece carriage 21 can be secured to the workpiece carrier 62 thereof so as to move upwardly with the latter and thus to be released from the attachment 45 of the endless conveyor 41.

Consequently the mating member 46 can in no way interfere with the workpiece carriage 21 being centered, as described, in relation to the respective machining station 14. However, it is not necessary for the mating member 46 to become released from the attachment 45 if either the attachments 45 have some play in relation to the chain 42 bearing them or the chain 42 itself has some give, for instance owing to moderate slack.

Accordingly, FIG. 1 indicates that the mating members 46 are secured directly to the workpiece carriages 21 and not to the workpiece carriers 62. Therefore the mating members 46 do not undergo the lifting movements of the workpiece carriers 62 in the machining stations 14.

At the end of each machining operation, the shifting drives 71 in all the machining stations 14 cause the workpiece carriers 62 of the workpiece carriages standing there to lower again. A limit switch 74 is provided in each machining station 14 and is associated with head 73 to indicate when the lower limit position is reached and thus when the workpiece carriages 21 are again ready for being transported along the work path 22.

At each machining station 14 there is a feed device, as per FIGS. 6 to 8, for turning in steps a circular saw blade S affixed to the arbor 63 of the workpiece carriage 21 standing in the machining station 14 in question, so that the saw teeth Z are advanced through one tooth spacing each time, in special cases through several tooth spacings. Each feed device includes a guide carriage 75 adapted to be shifted on a pair of fixed vertical slideways 76. A vertical threaded spindle 77 mounted on the machine housing 11 so as to be incapable of axial movement is bolted to each guide carriage 75. The threaded spindles 77, three in all, are connected through one cone-pulley drive 78 each to a common horizontal shaft 79 adapted to be driven by a stepping motor 80. On shaft 79 is secured a perforated disk 81 cooperating with a fixed counting initiator 82. The counting initiator 82 supplies signals whose evaluation indicates the height of all the carriages 75 at any instant.

To each guide carriage 75, a guide slideway 83 is swivel-mounted about an axis 84 extending horizontally at right angles to bars 26. A guide 85 extending radially to axis 84 is adapted to be shifted in its longitudinal direction in each guide slideway 83 and to be clamped by a clamping device 86 likewise disposed at the guide slideway 83. The guide 85 always extends essentially upwards and has at its upper end a head portion 87 carrying a pawl bearing 89 through a pivot axis 88 parallel to axis 84.

To the pawl bearing 89 a feed pawl 91 is swivel-mounted about an axis 92 parallel to pivot axis 88. A pair of small hydraulic cylinders 93 are disposed at the pawl bearing 89 to swivel the feed pawl 91. These enable the feed pawl 91 to selectively drop in or lift out of a tooth gap between two saw teeth Z, depending on whether the guide 85 swivels in the direction of feed, i.e. against the stepping direction of the saw blade S, or in the opposite direction.

A swivel drive 94 is provided for swivelling the guide 85. In the illustrated example, the swivel drive 94 takes the form of an electrohydraulic linear amplifier and has a hydraulic cylinder 95. Said cylinder 95 is swivel-mounted to the machine housing 11 about an axis 96 parallel to axes 84, 88 and 92 and has a piston rod 97 whose end is secured to the pawl bearing 89 and hence is articulated to the guide 85 through the pivot axis 88. The swivel drive 94 includes an electric set point adjuster with a motor 98.

The motor 98 is connected to an electronic control means 99, which also controls the motor 80 and receives signals from the various limit switches described. The said control means 99 includes a computer programmed such that it need be fed only with data on the diameter and number of teeth of saw blades S for the motor 80 to put the guide carriages 75 in all the machining stations 14 at a height at which the axis 84 of each guide slideway 83 is in alignment with the axis 64 of the arbor 63 of the workpiece carriage 21 standing in the machining station 14 in question; further, after a saw tooth Z has been treated, for the electrohydraulic linear servo motor associated with each guide 85 as swivel drive 94 to perform a linear movement to and fro which corresponds to the tooth spacing of saw blade S, so that the feed pawl 91 turns the saw blade S further by a respective amount.

To enable all the guide carriages 75 to be commonly adjusted in height as described, a command from the control means 99 is capable of locking the swivel drives 94 in a position in which the respective guide 85 is exactly vertical and hence exactly parallel to the respective slideways 76. Relative movement between guide 85 and guide carriage 75 is possible as soon as the guides 85 assume their vertical position and the respective clamping device 86 has opened, again responsive to a command from the control means 99.

Near the head portion 87 of each guide 85 there is a holding device 101 on the machine housing 11, so that the guides 85 do not slide in an uncontrolled manner in their slideway 83. Each holding device 101 has a hydraulic piston 102 which, in response to a command from the control means 99, can be moved against the pressure of a set of springs 103 and bears a pin 104. As the piston 102 moves, the pin 104 engages in a recess 105 in the head portion 87 and thus serves, in common with the piston rod 97 of the stopped swivel drive 94, to hold the guide 85 fast.

As soon as the guide carriages 75 have reached the desired position in height corresponding to the radius of the saw blades S to be machined, the clamping device 86 at each guide carriage 75 is actuated again so as to clamp the guide 85. Then the respective holding device 101 is released from hydraulic pressure, so that the set of springs 103 urges the pin 104 back, whereby the guide 85 becomes free to swivel about the axis 84 corresponding to the axis of the respective saw blade S.

What is claimed is:

1. A machine for machining circular saw blades, including
    an arbor (63) for a saw blade S,
    and a feed device for intermittently rotating the saw blade (S),
    a guide (85) adapted to be swivelled about the axis (64) of the arbor (63) and carrying at an adjustable radial distance from said axis (64) a pawl bearing (89) to which a feed pawl (91) is mounted for engaging behind each saw tooth (Z), and further including
    a swivel drive (94) for swivelling the guide (85) to and fro,
    wherein
    the guide (85) is adapted to be shifted longitudinally in a guide slideway (83) and to be clamped by a clamping device (86),
    the guide slideway (83) for the swivelling of the guide (85) is mounted to a guide carriage (75) which, for adjustment to different saw diameters, is radially adjustable relative to the arbor (63),
    the swivel drive (94) can be fixed in a position in which the guide (85) extends in the adjusting direction of the guide carriage (75),
    and a holding means (101) is associated with the guide (85) for holding it in the said position while the clamping means (86) is open for adjusting the guide carriage (75).

2. The machine as claimed in claim 1, wherein the swivel drive (94) is an electrohydraulic linear servo motor swivel-mounted on a fixed machine housing (11) and articulated to the guide (85).

3. The machine as claimed in claim 2, wherein the holding means (101) is devised to engage a head portion (87) of the guide (85), said head portion incorporating the pivot axis (88) of the swivel drive (94).

4. The machine as claimed in claim 3, wherein the holding means (101) has a pin (104) devised to engage in a recess (105) at the head portion (87) side averted from the swivel drive (94).

* * * * *